Apr. 10, 1923.                                                                1,450,907
A. BARR ET AL
APPARATUS FOR TESTING AND RECORDING THE EFFICIENCY OF RANGE FINDER OPERATORS
Filed Aug. 26, 1921

INVENTORS:
Archibald Barr
William Stroud
By J. Walter Fowler
   Attorney

Patented Apr. 10, 1923.

1,450,907

UNITED STATES PATENT OFFICE.

ARCHIBALD BARR AND WILLIAM STROUD, OF ANNIESLAND, GLASGOW, SCOTLAND, ASSIGNORS TO BARR AND STROUD, LIMITED, OF ANNIESLAND, GLASGOW, SCOTLAND.

APPARATUS FOR TESTING AND RECORDING THE EFFICIENCY OF RANGE-FINDER OPERATORS.

Application filed August 26, 1921. Serial No. 495,550.

(GRANTED UNDER THE PROVISIONS OF THE ACT OF MARCH 3, 1921, 41 STAT. L., 1313.)

*To all whom it may concern:*

Be it known that we, ARCHIBALD BARR and WILLIAM STROUD, subjects of the King of Great Britain and Ireland, and both of Caxton Street, Anniesland, Glasgow, Scotland, have invented new and useful Improvements in Apparatus for Testing and Recording the Efficiency of Range-Finder Operators (for which we filed an application in Great Britain, No. 7853, dated May 27, 1905), of which the following is a specification.

The object of our invention is to provide means for testing and recording the efficiency of rangefinder-operators with a view of selecting persons best qualified to act as takers of ranges, and further to enable persons to practise at rangefinding operations with a view of recording their progress in efficiency.

We shall describe our invention in the first instance as applicable to observations of the coincidence type. For this purpose we provide a model corresponding to the appearance in a rangefinder field when a "cut" is being taken, consisting, say, of two vertical rods with the equivalent of a separating line between them, one of which rods can be displaced laterally by suitable mechanism operated by a working head. Geared or attached to this working head is a pen or pencil arranged so as to be moved to and fro over and so to mark a strip of paper, the gearing being such that the motion of the pen is much greater than that of the rod. As soon as the two rods (or their images) appear in coincidence, a key may be depressed which advances the paper at right angles to the direction of motion of the pencil, and so registers the position of the "cut" with reference to a fiducial zero line corresponding to correct coincidence.

In order to be able to register this correct position of coincidence with far greater accuracy than that possible when testing the efficiency of observers, we may arrange a convex lens of short focus so as to produce a magnified image of the rods for registering the correct position of coincidence, while we may arrange a concave lens, or lenses, at some distance from the rods so as to produce a much diminished image to be used for testing purposes.

In order to provide the equivalent of a target in motion while still retaining the same fiducial zero as an indicator of correct coincidence, we may employ a differential gear 1, 2, 3, of which 2 is, say, the jockey element. One of these elements is geared directly to the movable rod and pencil, a second element is fixed to the working head, while the third can be moved independently by hand or otherwise in a continuous or variable manner. Thus, when the working head is stationary, there will be relative motion between the two rods, but by turning the working head, observations of coincidence may be carried out in the same manner as before.

To imitate the appearance presented in the case of a stereoscopic rangefinder, we may replace the two rods in one field of view by two fields of view, one for the right and the other for the left eye. In the one field we may have a stationary picture of the target and a fixed mark, while in the other field of view we have a picture of the target, and a mark, one of which, say, the picture is arranged to be moved laterally by the working head, the motion of which produces a proportionate and much magnified movement of the pencil just as before.

We do not confine ourselves to these details, the essential feature of the instrument consisting in the provision of means for making an imitation of the optical appearance characteristic of a rangefinder, and the recording of the observations upon a strip of paper on a suitably magnified scale.

Some examples of construction will now be described with reference to the accompanying drawing, in which:—

Figure 4:
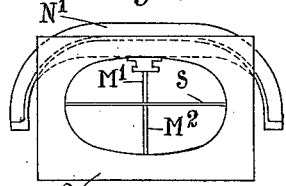
Figure 4 is an end elevation of a detail, illustrating an apparatus according to our invention when applied to the coincidence method of working.

In the drawing the object represented is, say, a mast designated generally M and S designates the separating line. The "mast" consists of two parts $M^1$ and $M^2$, see Figures 2 and 4, of which $M^1$, attached to a carrier $N^1$ remains stationary, while $M^2$ attached to $N^2$ is movable laterally through a small distance by rotation of a screw A. The separating line may conveniently be produced by providing a thin strip of metal S, seen edgewise, which may be attached to $N^2$. $M^2$ may be attached to the strip S. B is a working head which operates through a differential gear. The differential gear may take various forms. In that shown the shaft of the working head B carries a pinion 1. An internally toothed wheel 3 surrounds 1 and a pinion 2 gears with 1 and 3. The spindle of the pinion 2 is carried on an arm 4. For clearness the pinion 2 is shown in different positions in Figures 1 and 2. The arm 4 is formed in one part with a toothed sector 5. The arm 4 and the shaft of the screw A are connected to rotate together, the arm 4 being free to revolve relatively to the spindle of the working head B. If the internally toothed wheel 3 is held stationary, any rotation of the working head B will produce a rotation of the arm 4 and with it the sector 5. The toothed segment 5 gears with a rack 7 guided in a suitable manner, which carries a pen or pencil 8. The pen or pencil rests on a strip of paper 9 which is guided by the curved plates 10, 11, and passes between rollers 12 and 13. On the roller 12 a ratchet wheel 14 is carried, which is actuated by means of a lever 15 and pawl 16, so that when 15 is depressed the paper moves one step to the left. The lever 15 may be returned to its normal position by means of a spring 17. In this manner the position occupied by the pen 8 when the lever is pressed is recorded, and as any motion of 4 is accompanied by a corresponding small motion of $M^2$ relatively to $M^1$, the mark on the paper 9 records the relative position of $M^2$ and $M^1$.

In order that the smallest relative motion of $M^2$ and $M^1$, that can be detected, may not be inconveniently small, the mast ($M^1$, $M^2$) is not viewed directly, but through a lens system $L^1$ $L^2$ and eyepiece E, arranged to give a diminished image of the mast generally very much diminished.

To enable the operator to know with certainty the position occupied by the pen when $M^1$ and $M^2$ are in correct alignment, a magnifying glass may be provided for viewing $M^1 M^2$, or preferably the lenses $L^1$ and $L^2$ may be so arranged that they can be readily removed, and the mast viewed without the minifications they are arranged to produce. The focal lengths and positions of $L^1$ and $L^2$ may be so chosen that they produce a much reduced virtual image mast in the plane of the mast, so that the eyepiece E may be used for viewing either the virtual image when $L^1$ and $L^2$ are in place, or the mast itself when $L^1$ and $L^2$ are removed.

Provision may be made for adjusting the instrument, so that the pen lies on the line C, when $M^1$ $M^2$ are in true coincidence. Thus the end of the screw A may be in a screwed bush 18 when by rotating the bush, $M^2$ can be moved into correct alignment with $M^1$, when the pen lies on the centre line C of the paper. For this adjustment some endwise freedom of the screw A and associated parts may be allowed and a spring provided operating to retain the end of the screw A in contact against bush 18.

In order to provide the equivalent of a moving object whose range is altering, we may provide means for producing a rotation of the screw A independently of the motion of the working head B. This may conveniently be accomplished by means of a handle 19, acting through gear wheels 20, 21, 22, in a toothed wheel 23, attached to the internal wheel 3. When the handle 19 is turned by someone else, the operator will see the part $M^2$ moving with respect to $M^1$, and will adjust it back into coincidence by moving B. When he is satisfied that he has produced a true "cut" he presses the lever 15 and records his observation.

Figure 1:
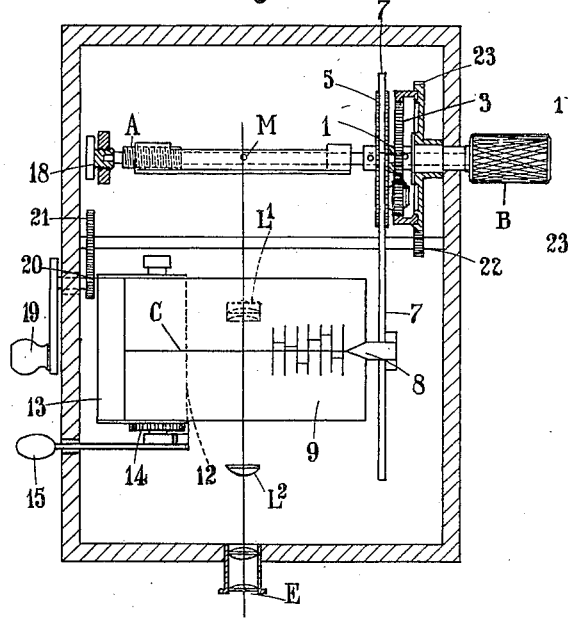
Figure 1 is a plan partly in section, Figure 2 a longitudinal side elevation showing some of the parts, Figure 3 a cross sectional end elevation of a portion of the apparatus
Figure 2:
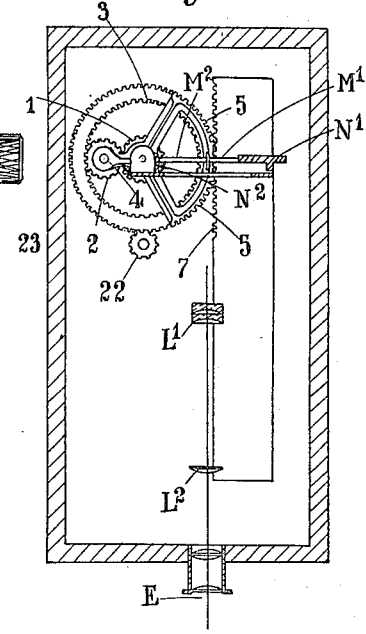
Figure 3:
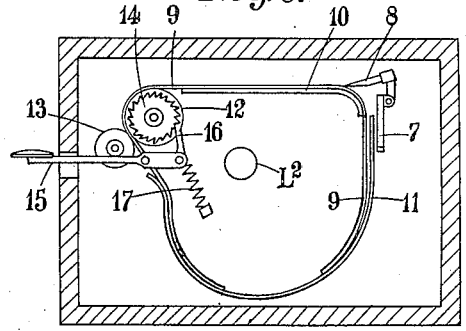

The form of record will be that shown in Figure 1, and the amount of displacement, a longitudinal mark from the fiducial line C is a measure of the error in the corresponding observation.

Figure 5:
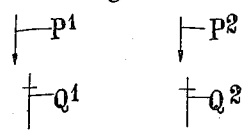
Figures 5 and 6 are views indicating the adaptation of our invention for the stereoscopic method of working.

In order to adapt the instrument for the stereoscopic method of working, we may provide two lens systems similar to $L^1$ $L^2$ E, situated at about 2½ inches apart horizontally and in place of the marks $M^1$ $M^2$, we provide two stationary marks $P^1$ and $P^2$, a stationary mark $Q^1$ and a movable mark $Q^2$ (Figure 5). The marks $P^1$ and $P^2$ are so placed that they appear to the eyes as one object situated at a considerable distance from the observer, and the images $Q^1$ and $Q^2$ similarly appear as one object. By operation of the working head, the mark $Q^2$ is moved nearer to or farther from $Q^1$ until to the observer the object Q appears to be at the same distance as the object P.

Figure 6:
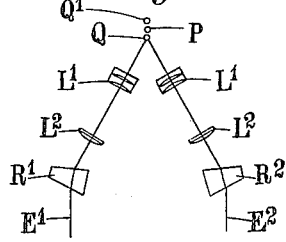

The apparatus, see Figure 6, may be modified by using only one mark P and one mark Q, and by means of reflectors, or refracting prisms $R^1$ $R^2$ the rays are brought into two eyepieces $E^1$ $E^2$ set at the interocular distance. In this case the mechanism is so arranged that in operating the working head, the mark Q is moved longitudinally instead of transversely as represented by Q Q¹ until to the observer it appears to be at the same distance as the object P.

We claim:—

1. An instrument comprising marks, one a movable mark, movable from a fiducial position, optical means for viewing the marks and for producing a reduced image of the marks, means for moving the movable mark, and means for recording on an enlarged scale the position of the movable mark relative to the fiducial position, for the purposes set forth.

2. An instrument comprising a fixed mark and a movable mark, movable from a fiducial position, optical means for viewing the marks and for producing a reduced image of the marks, means for moving the movable mark, and means for recording on an enlarged scale the position of the movable mark relative to the fiducial position, for the purposes set forth.

3. An instrument comprising marks, one a movable mark, movable from a fiducial position, optical means for viewing the marks and for producing a reduced image of the marks, means comprising differential gear for moving the movable mark, and means for recording on an enlarged scale the position of the movable mark relative to the fiducial position.

4. An instrument comprising marks, one a movable mark, movable from a fiducial position, optical means for viewing the marks and for producing a reduced image of the marks, differential gear, means for imparting motions to two elements of said gear, the third element of said gear being associated with the movable mark and with means for recording on an enlarged scale the position of the movable mark relative to the fiducial position, for the purposes set forth.

ARCHIBALD BARR.
WILLIAM STROUD.